United States Patent [19]
Ono et al.

[11] 3,885,015
[45] May 20, 1975

[54] METHOD OF PROCESSING A HEAT-SHRINKABLE SHEET-LIKE MATERIAL

[75] Inventors: Michikaze Ono; Toshio Ito; Shoichi Nagai, all of Nagoya; Hironaga Mizuno, Nagakute-Mura, all of Japan

[73] Assignee: Mitsubishi Rayon Co., Ltd., Tokyo, Japan

[22] Filed: Jan. 11, 1973

[21] Appl. No.: 322,823

[52] U.S. Cl............... 264/230; 26/69 A; 28/72 FT; 264/282; 264/342; 264/DIG. 71
[51] Int. Cl............................................. B29c 25/00
[58] Field of Search............... 264/230, 282, 342 R; 26/69 A, 69 R; 28/72 FT

[56] References Cited
UNITED STATES PATENTS

| | | | |
|---|---|---|---|
| 2,524,895 | 10/1950 | Dodge | 26/1 X |
| 2,536,048 | 1/1951 | Flanagan | 264/25 |
| 2,700,205 | 1/1955 | Rice | 26/69 A X |
| 3,484,839 | 12/1969 | Neumann | 264/282 X |
| 3,501,565 | 3/1970 | Kalwaites | 264/282 X |
| 3,673,650 | 7/1972 | Cerutti | 264/290 N |

*Primary Examiner*—Donald J. Arnold
*Assistant Examiner*—Thomas P. Pavelko
*Attorney, Agent, or Firm*—Sughrue, Rothwell, Mion, Zinn & Macpeak

[57] ABSTRACT

A method of processing a heat-shrinkable sheet-like material comprising passing said sheet-like material under low tension between a heating device A heated at a temperature higher than a point at which said sheet-like material begins to shrink and a device B which controls the rising of the heated sheet-like material and which is spaced from said heating device A by a distance larger than the thickness of said sheet-like material while bringing the sheet-like material into contact at least with the heating device A without positive pressing thereto, heating the sheet-like material and developing a random solid heat-shrinkage pattern thereon.

4 Claims, 32 Drawing Figures

METHOD OF PROCESSING A HEAT-SHRINKABLE SHEET-LIKE MATERIAL

BACKGROUND OF THE INVENTION

1. Field of the Invention

This invention relates to a method of producing a sheet-like material having a unique outward appearnace by developing a solid heat-shrinkage pattern on an heat-shrinkable sheet-like material such as a woven fabric, a knitted fabric, a non-woven fabric, a paper or a film.

2. Description of the Prior Art

Solid patterns have hitherto been imparted to sheet-like materials by such methods as:

1. Heating two sheet-like materials of different heat-shrinkability in a bonded or sewn state to develop solid patterns by the difference in their shrinkage.
2. Hot-pressing a sheet-like material with embossing rollers to form the patterns on the rollers on the surfaces of the sheet-like material.
3. Applying to a sheet-like material a solvent, swelling agent or heat-insulating substance at the desired portions, and then heat-treating the sheet-like material to develop solid patterns by the difference in shrinkage between non-treated portions and treated portions.
4. Embroidering a sheet-like material using a heat-shrinkable yarn, and then heat-treating the sheet-like material to develop solid patterns in the material by the influence of the shrinkage of the yarn.

Of these, method (1) essentially requires the use of two sheet-like materials having different heat-shrinkability, and includes the complicated step of bonding or sewing. This results in a high processing cost, and for various reasons the utility of the final product is limited.

With the practice of method (2) unwanted luster tends to occur on the surfaces of the sheet-like material because the high pressures needed for pressing, and only a pattern of limited variety can be obtained. It is also difficult to obtain a rugged feel on the patterned surface by such a process.

Method (3) suffers from the disadvantage of increased cost of processing on account of using various chemicals, the need to consider the toxicity and flammability and also the need for washing and removing the chemicals applied.

Method (4) has the disadvantage that the use of a special yarn is essential, and this complicates the whole process.

SUMMARY OF THE INVENTION

The present invention contemplates the development of a relief pattern on a sheet-like material by a new method which differs from any prior art method.

According to the present invention, there is provided a method of processing a heat-shrinkable sheet-like material which comprises passing the sheet-like material under low tension between a heating device (to a referred to as heating device A) heated at a temperature higher than the point at which the sheet-like material begins to shrink and a heating or non-heating device which controls the rising of the heated sheet-like material (to be referred to as device B) spaced from the heating device A by a distance greater than the thickness of the sheet-like material while bringing it into contact with at least the heating device A without positive pressing thereto, to thereby develop random heat-shrinkage patterns on the sheet-like material. The random heat shrinkage pattern, in the present invention, comprising venous-or network-shaped portions (heat shrunk parts) formed by bringing the above described sheet-like material into contact with the heating device and bulged or raised portions (non-or slightly-heat shrunk portions) which are surrounded by the above described heat shrunk portions. By changing processing conditions, heat shrinkage patterns of various sizes can be obtained.

The present invention has the following advantages.

1. A single sheet of the sheet-like material can be easily processed.
2. Since the sheet-like material is processed under low tension without positive pressing against at least device A, and preferably without position pressing against devices A and B, unwanted luster does not occur as in the case of the embossing treatment, and a product having raised and sunken surfaces can be obtained. '3. The use of an adjuvant such as a swelling agent or solvent is not required.
4. Even if the surfaces of the devices A and B are smooth, a rugged pattern can be developed.
5. By passing the sheet-like material under low tension between the devices A and B, spaced from each other at a predetermined distance, a heat-shrinkage pattern can be obtained with very good reproducibility. On the other hand, if the sheet-like material is merely contacted with a heating device under low tension, it is difficult to develop a heat-shrinkage pattern of of excellent reproducibility.
6. By changing the shape of the device A or B or the method of contactibg the sheet-like material therewith, or subjecting the sheet-like material to various pre- or post-treatments, patterns which vary in both form and kind can be provided thereon.

DETAILED DESCRIPTION OF THE INVENTION

The heat-shrinkable sheet-like material that can be used in the present invention may be a material composed only of a heat-shrinkable thermoplastic substance, or a mixture of a major proportion of the thermoplastic substance with a minor proportion of a non-heat-shrinkable material obtained by mixing or blending the components in a spinning, weaving, knitting or sheet-forming operation (for example, a film, non-woven fabric, paper, woven fabric or knitted fabric). Examples of the thermoplastic substance are polyester, polyamides, polyolefins, polyvinyl alcohol, polyacrylonitrile, polyvinyl chloride, polyvinylidene chloride, and polyurea in such a form as fibers or films, including polyesters such as polyethyleneterephthalate, polybutyleneterephthalate, poly 1,4-bismethylene cyclohexane terephthalate, polyethylene naphthalene-2,6-dicarboxylate, polyethylenediphenoxyethane 4,4'-dicarboxylate, polyethylene p-oxybenzoate and copolymers of such materials, polyamides such as polycaproamide, polyhexamethylene adipamide, polytetramethylene adipamide, polypentamethylene adipamide, polyheptamethylene adipamide, polyoctamethylene adipamide, polyhexamethylene sebacamide etc., polyacrylonitrile and copolymers thereof such as copolymer composed of acrylonitrile and vinyl acetate, vinyl chloride, acryric acid, methacrylic acid, styrene, vinylpyridines and other vinyl monomers, and polyolefins such as polyethylene, polypropylene and copolymers thereof. Specific examples of the non-heat-shrinkable material are vegetable fibers such as cotton or flax, animal fibers such as wool or silk, regenerated fibers or films such as viscose rayon or cuprammonium rayon and semi-synthetic fibers or films such as cellulose acetate.

The sheet-like material having heat shrinkability desirably has a specific volume of not more than 5 cm³/g and a maximum shrinkage stress under dry heat of not less than 1/10 W g/cm (W is the weight in grams of the heat-shrinkable sheet-like material per square meter). With sheet-like materials of high bulk having a specific volume in excess of 5 cm³/g, such as jersey or napped knitted or woven goods, there is encountered difficulty in developing heat-shrinkage patterns of excellent outward appearance, even when heat-shrink. On the other hand, with sheet-like materials having a maximum heat-shrinkage stress under dry heat of less than 1/10 W g/cm, for example a sheet-like material composed predominantly of a non-heat-shrinkable material, difficulty is encountered in developing heat-shrinkage patterns of excellent outward appearance even if they have a specific volume of not more than 5 cm³/g.

In the present invention, films, non-woven fabrics, paper, knitted fabrics, woven fabrics, etc., composed of a material consisting of a major proportion of the heat-shrinkable thermoplastic substance can generally be used. When a film, non-woven fabric, woven fabric such as taffeta or twill, or a knitted fabric such as tricot consisting only of the thermoplastic substance is used, a heat-shrinkage pattern of excellent outer appearance can be developed on such a sheet-like material.

In order to exhibit the effects of the present invention it is preferred to use a sheet-like material having a dye adhered thereto. By non-uniformly coloring such a sheet-like material concurrently with the development of the heat-shrinkage patterns, the effects of the present invention manifest themselves conspicuously in the form and color of the sheet-like material. Disperse dyes are preferably used for this purpose, but cationic dyes, acid dyes and reactive dyes may also be used as occasion demands.

The application of the dye to the sheet-like material can performed by any desired method. For example, the sheet-like material can be immersed in a dye bath and dried after sequeezing. Or a mixture of a printing paste and a dye may be printed on the sheet-like material and dried. Drying is usually carried out at a low temperature, e.g., about 80° to about 120°C in order to prevent the color development of the dye, but it is sometimes permissible to employ a temperature at which the dye develops its color to some extent. The drying temperature should, however, be lower than the temperature of the heating device used to produce the heat-shrinkage pattern.

The process of producing the heat-shrinkage pattern on the sheet-like material will be described below.

In order to develop an excellent heat-shrinkage pattern on the sheet-like material, it is necessary to contact the sheet-like material with the heating device under a tension (D) which is less than the heat shrinkage stress (C), i.e., the sheet-like material must be processed at a tension (D) which is lower than heat shrinkage stress (C), preferably D<1/5C.

If the tension (D) is not less than the shrinkage stress (C), it is difficult to produce a heat-shrinkage pattern.

The shrinkage stress of a sheet-like material cannot be unequivocally determined because it varies according to various factors such as the form, heat history or kind of raw material of the sheet-like material or the content of non-heat-shrinkable material. For example, a taffeta (unit weight 73 g/cm², thickness 0.12 mm) made of 75d/36 polyester filaments has the following heat-shrinkage stress values at the temperatures indicated.

The heat-shrinkage stress (C) is determined as follows: A sheet-like material having a width of 1 cm and a length of 10 cm is fixed at both ends in the longitudinal direction. Stress which occurs on the sheet-like material with a rise in the atmospheric temperature is expressed in grams per cm (force which occurs per cm of the width of the sheet-like material).

| Temperature (°C.) | Heat-Shrinkage Stress (g/cm) (in the longitudinal direction) | | |
|---|---|---|---|
| | Pre-heatsetting (°C.) | | |
| | None | 140 | 190 |
| 100 | 240 | 70 | 20 |
| 120 | 360 | 100 | 50 |
| 140 | 410 | 200 | 80 |
| 160 | 430 | 240 | 110 |
| 180 | 420 | 250 | 160 |
| 200 | 380 | 240 | 200 |
| 220 | 300 | 200 | 180 |

The temperature ($A_T$) of the heating device A should be maintained within the range expressed by the following equation during processing.

$$T_s \leq A_T < T_m$$

wherein $T_s$ is the minimum temperature at which the heat-shrinkable sheet-like material can shrink, and $T_m$ is the melting or softening point of a thermoplastic substance contained in the sheet-like material.

The minimum temperature ($T_s$) at which the sheet-like material can shrink is a temperature at which the heat-shrinkable sheet-like material can develop heat-shrinkage stress higher than the tension and the own weight of the sheet-like material during processing. From the viewpoint of the durability (form retention during washing, for example) of the heat-shrinkage pattern obtained by the processing, this temperature is preferably at least 100°C.

The upper limit of the temperature of the heating device A is generally the melting point of the heat-shrinkable thermoplastic substance contained in the heat-shrinkable sheet-like material. Where the sheet-like material does not show a clear melting point, $T_m$ stands for the softening temperature of the heat-shrinkable thermoplastic material.

As shown in FIGS. 1 to 7 and 13, 15, 17, 19, 21, 24, 27 and 30, the surface of the heating device A may, wholly or partly, comprise a smooth flat surface, a smooth curved surface, a plane partly having projections, a curved surface partly having projections, a plane partly having depressed portions or a curved surface partly having depressed potions. Generally, a circular heating roller having a smooth surface or heating plate having a smooth surface is used. There can also be used a roller having a polygonal sectional configuration, a roller partly having projected or depressed portions, an elliptical roller or a heating plate partly having projected or depressed portions.

The critical feature of the present invention is that the sheet-like material is passed between the heating device A described above and the device B spaced from said device A by a predetermined distance while bringing it in contact with at least the heating device A without positively pressing it there against. This method of processing is quite different in concept from the conventional method of molding fabrics by positively heating and pressing the fabrics with an embossing or calendering roller.

For example, portions of the sheet-like material which have been contacted with at least the heating device A shrink and rise in a direction substantially perpendicular to the heating device A.

A sheet-like material having a small specific volume and a high heat-shrinkage stress does not come into full contact with the heating device A, and after portions thereof rise as a result of contact with the heating device A the sheet-like material is held by the device B spaced from the heating device A by a predetermined distance. In this state, the sheet-like material is again contacted with the heating device A whereby a heat-shrinkage pattern occurs successively. When a sheet-like material having adhered thereto a dye that can dye the material at high temperatures is used, those portions which have come into direct contact with the heating device A are strongly colored, and the raised portions are hardly colored or colored only to a slight extent. Therefore, there can be obtained a sheet-like material having a heat-shrinkage pattern in which portions of high heat-shrinkage and portions of low heat-shrinkage are dyed in different dark and light shades.

The surface temperature ($B_T$) of the device B should be maintained within the range expressed by the following equation.

$$T_R \leq B_T < T_m$$

wherein $T_R$ is the temperature of the atmosphere during processing, and $T_m$ is the same as defined above.

Under ordinary processing conditions, the surface temperature $B_T$ is near the atmospheric temperature, but if desired, it may be close to the surface temperature $A_T$ of the heating device A.

Where the surface temperatures of the devices A and B are the same ($A_T=B_T$), both surfaces of the sheet-like material are heated, and the resulting sheet-like material has a heat-shrinkage pattern which has bulged portions on both surfaces, thus exhibiting a different outward appearance from the case when $B_T$ is lower than $A_T$. The surface of the device B may either be smooth or rugged according to the surface form of the heating device A. Specifically, the device B may be a circular roller, plate or rod having a smooth surface or a roller, plate or rod having a rugged surface.

Another feature of the present invention is that the devices A and B are spaced from each other by a predetermined distance K expressed by the following equation.

$$L < K \leq 100L$$

wherein L is the thickness of the sheet-like material having heat shrinkability, generally 0.05~5 mm. The resulting heat-shrinkage pattern differs according to the distance K. Where K is small (for example, K is 2L to 5L), a small heat-shrinkage pattern is obtained, and when it is large (for example, K is 20L to 100L), a large heat-shrinkage pattern can be obtained.

Without the device B (namely, using only the heating device A), it is possible to produce a heat-shrinkage pattern on the sheet-like material to some extent, but the provision of the device B spaced from the heating device A by a distance K brings about the following advantages.

1. The reproducibility of the heat-shrinkage pattern is superior.
2. The outward appearance of the heat-shrinkage pattern is excellent.
3. The speed of processing can be drastically increased as a result of increased area of contact with the heating device A.
4. By changing the shape of the heating device A and/or the device B, various different heat-shrinkage patterns can be easily produced on the sheet-like material.

The distance K varies according to the thickness of the sheet-like material. As previously stated, however, it is larger than the thickness of the sheet-like material but not larger than 100 times the thickness, preferably larger than 3 times the thickness but smaller than 50 times the thickness.

Two or more heating device A and/or device B may be used in combination. From the viewpoint of increasing the speed of processing, the use of a plurality of heating device A and/or a plurality of device B is desirable. At such a case, the devices are desirably arranged so that the distance K between them becomes progressively smaller towards the advancing direction of the sheet-like material. Where it is desired to obtain a sheet-like material having an especially small heat-shrinkage pattern, the distance K should be small. But if the sheet-like material is passed from the outset between the heating device A and the device B spaced from each other by a small distance, the sheet-like material tends to be creased because of the abrupt occurrence of heat shrinkage, and this frequently impairs the outward appearance of the resulting sheet-like material.

The time of contact of the sheet-like material with the heating device A is generally not more than 30 seconds, although differing, according to the shape, arrangement and temperature of the heating device A and the shape, kind of raw material and heat history, etc. of the sheet-like material. In ordinary processing, the contacting time may be a very short period, e.g., not more than about 10 seconds. Long contact of the sheet-like material with the heating device A held at high temperatures sometimes causes the sheet-like material to become brittle or to discolor. Therefore, unless special conditions are needed, it is desirable to avoid contact for more than 30 seconds.

The heating device A and the device B may be arranged transversely, obliquely or vertically. If desired, the arrangement may be a combination of these modes. The heating device A or the device B (when it is a heating body) may be heated by any well known direct heating or indirect heating method.

The invention will now be described in greater detail by reference to the accompanying drawings.

Figure 1:
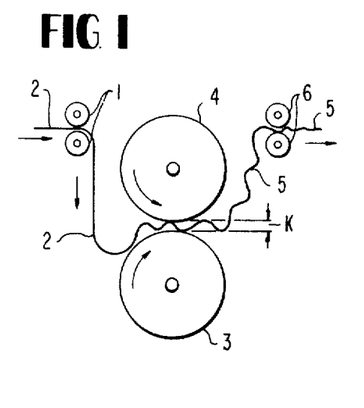
FIGS. 1 and 3 to 7 are views showing the process and apparatus for performing the method of this invention.
Figure 2:
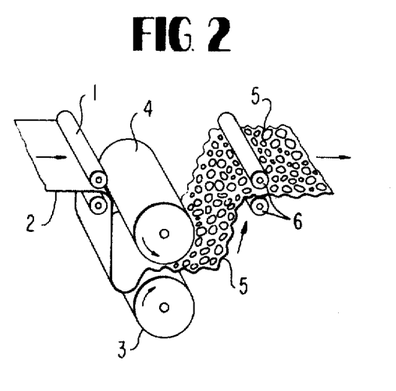
FIG. 2 is a perspective view of the apparatus shown in FIG. 1.

Referring to FIG. 1, a heat-shrinkable sheet-like material 2 delivered from a pair of delivery rollers 1 comes into contact with a heating roller 3 having a smooth surface under low tension, and passes through a space which is a predetermined distance K between the roller 3 and a heating or non-heating roller 4. The sheet-like material 5 on which a heat-shrinkage pattern has been produced is taken up by a pair of rollers 6 under low tension.

Figure 3:
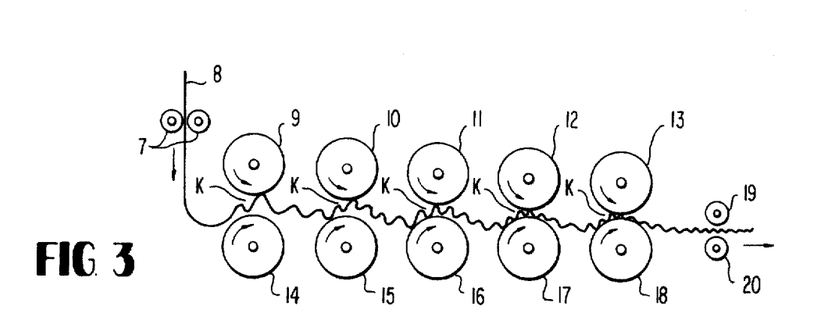

In FIG. 3, a sheet-like material 8 is delivered by a pair of delivery rollers 7. The reference numerals 9 to 13 are heating or non-heating rollers which go in pairs with heating or non-heating rollers 14 to 18 respectively. At least one roller of each pairs must be heated. The distance K between the upper and lower rollers is such that it becomes progressively smaller in advancing direction of the sheet-like material. The sheet-like material is passed between this roller pair.

The processed sheet-like material 19 is taken up by a pair of take-up rollers 20.

Figure 4:
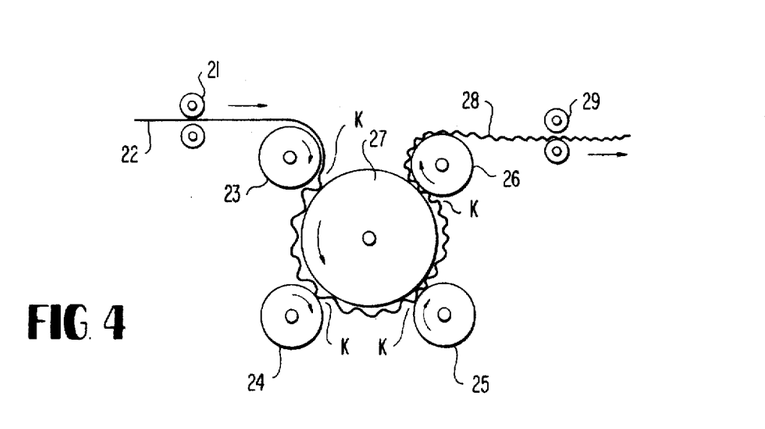

Referring to FIG. 4, sheet-like material 22 delivered from a pair of delivery rollers 21 is passed between a roller 27 and rollers 23, 24, 25 and 26 spaced from each other by a distance K. The sheet-like material 28 on which a heat-shrinkage pattern has been developed is taken up by a pair of take-up rollers 29. Where the roller 27 is a heating device, the rollers 23, 24, 25 and 26 are either heating or non-heating rollers. On the other hand, when the roller 27 is a non-heating device, the rollers 23, 24, 25 and 26 are heating rollers.

Figure 5:
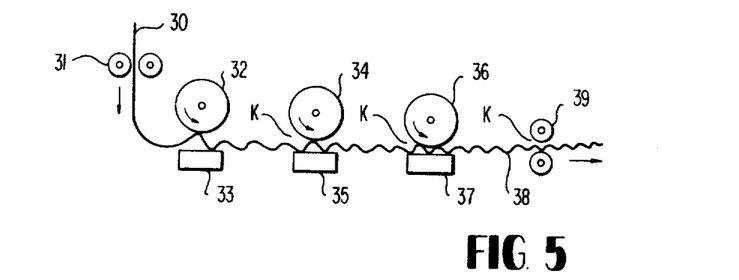

Referring to FIG. 5, sheet-like material 30 is delivered by a pair of delivery rollers 31. The reference numerals 32, 34 and 36 represent rollers which go in pair with plates 33, 35 and 37. At least one roller or plate of each pair must be heated. The distance K between the rollers and the plates is such that it becomes progressively smaller towards the advancing direction of the sheet-like material. The processed sheet-like material is taken up by a pair of take-up rollers 39.

Figures 6, 7:
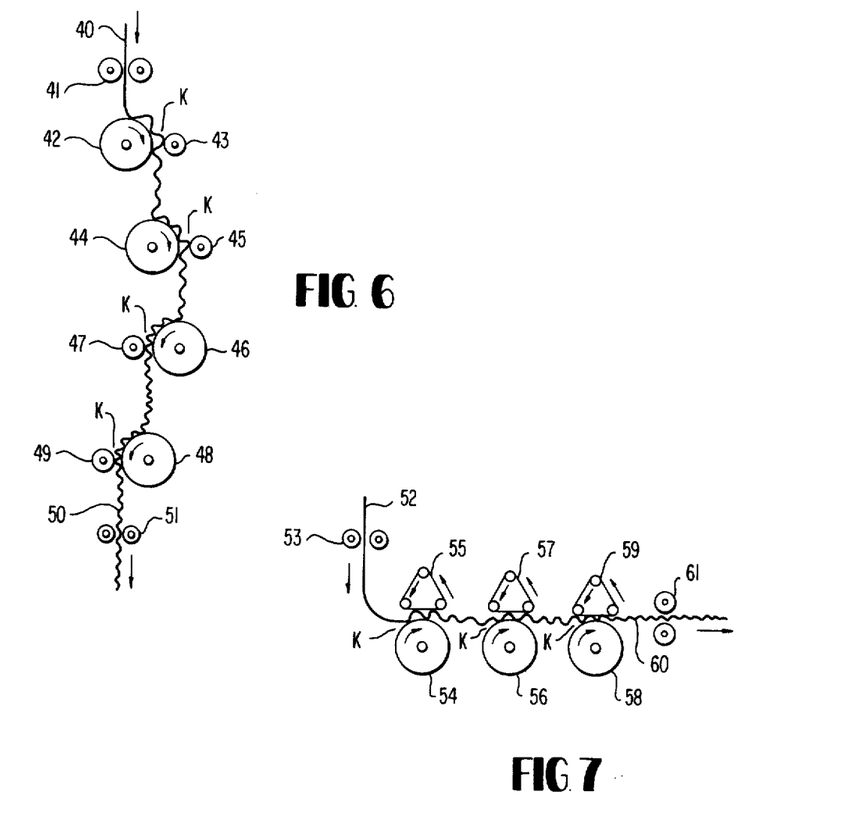

In FIG. 6, sheet-like material 40 is delivered by a pair of delivery rollers 41. The reference numerals 42, 44, 46 and 48 represent rollers arranged so that the sheet-like material advances downwardly from above, which rollers go in pair with rollers 43, 45, 47 and 49, respectively. At least one roller of each pair must be heated. The distance K between a pair of these rollers is such that it becomes progressively smaller towards the advancing direction of the sheet-like material. The sheet-like material passes through a space having distance K.

The processed sheet-like material 50 is taken up by a pair of take-up rollers 51.

Referring to FIG. 7, a sheet-like material 52 is delivered by a pair of delivery rollers 53. The reference numerals 54, 56 and 58 represent heating rollers which go in pair with non-heating belts 55, 57 and 59, respectively. The distance K between the rollers and the belts is such that it becomes progressively smaller in the direction of form and travel of the sheet-like material. The sheet-like material passed through a space having this distance, and the processed sheet-like material 60 is taken up by a pair of take-up rollers 61.

Figure 13:
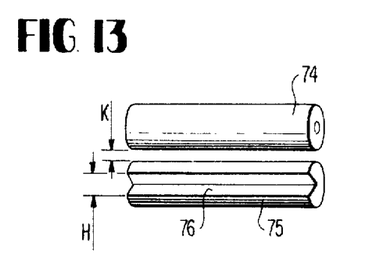
FIGS. 13, 15, 17, 19, 21, 24, 27 and 30 are views illustrating a part of the processing apparatus in accordance with the present invention.

In FIG. 13, one of a pair of rollers 74 and 75 is a heated roller. The roller 75 has a groove portion 76 on the surface. These rollers are spaced from each other by a distance K, and the groove portion 76 has a width H. In the following Figures also, K represents the distance.

Figure 15:
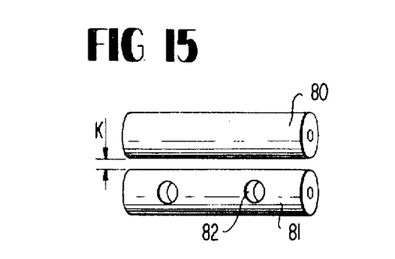

In a similar manner, FIG. 15 illustrates a pair of rollers 80 and 81, one of which is a heated roller. The roller 81 includes notched portions 82.

Figure 17:
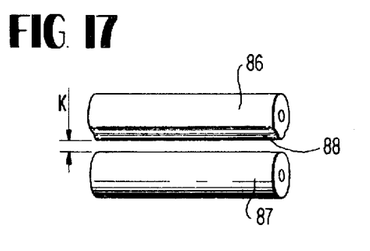

In FIG. 17, at least one of a pair of rollers 86 and 87 is a heated roller. The roller 86 includes a protruding portion 88, but both rollers are spaced from each other by a distance K which is larger than the thickness of the sheet-like material.

Figure 19:
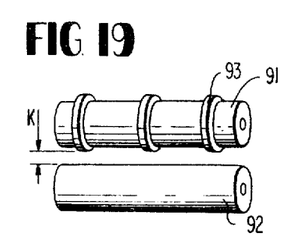

In FIG. 19, at least one of a pair of rollers 91 and 92 is a heated roller, and the roller 91 includes protruding portions 93.

Figure 21:
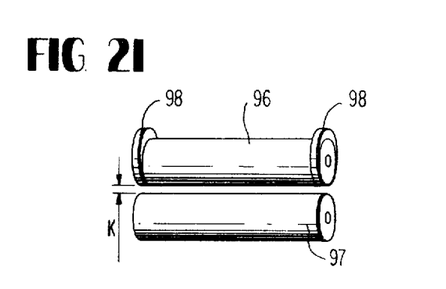

In FIG. 21, at least one of a pair of rollers 96 and 97 is a heated roller. Eccentric rings 98 are secured to both ends of the roller 96.

Figure 22:
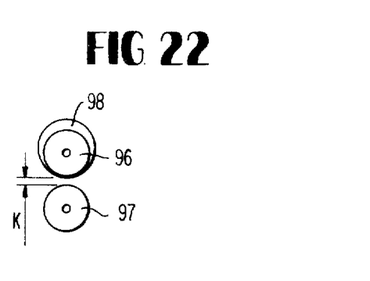
FIG. 22 is a sectional view of the apparatus shown in FIG. 21.

FIG. 22 is a sectional view of the rollers shown in FIG. 21. In this embodiment, the distance K between the rollers varies regularly.

Figure 24:
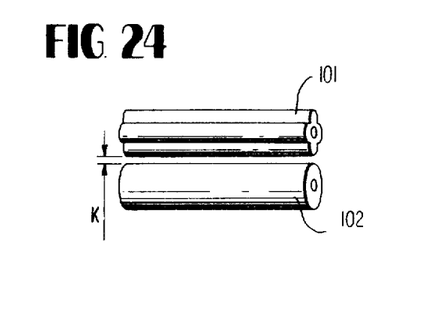

In FIG. 24, at least one of a pair of rollers 101 and 102 is a heated roller, and the roller 101 includes circular projections.

Figure 25:
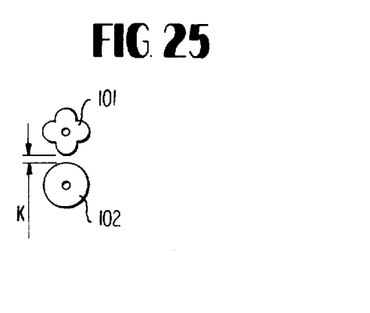
FIG. 25 is a sectional view of the apparatus shown in FIG. 24.

FIG. 25 is a sectional view of the rollers shown in FIG. 24. In this embodiment, the distance K between the rollers varies regularly.

Figure 27:
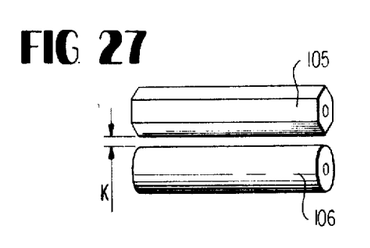

In FIG. 27, the reference numeral 105 represents a polygonal rotary body, and the reference numeral 106, a circular roller. One or these rollers is a heated roller.

Figure 28:
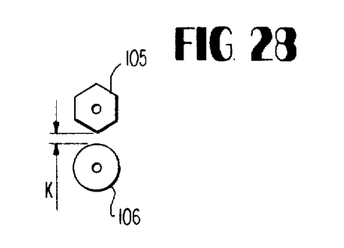
FIG. 28 is a sectional view of the apparatus shown in FIG. 27.

In FIG. 28 is a sectional view of the apparatus shown in FIG. 27. The distance K varies in a regular manner.

Figure 30:
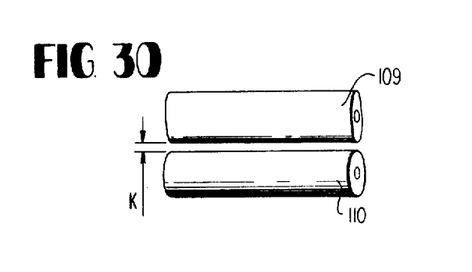

FIG. 30 shows an elliptical roller 109 and a circular roller 110, one of which is a heated roller.

Figure 31:
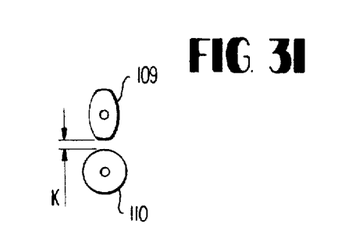
FIG. 31 is sectional view of the apparatus shown in FIG. 30.

FIG. 31 shows a sectional view of the embodiment shown in FIG. 30, in which the distance K varies in a regular manner.

Using the various apparatus as shown in FIGS. 8 to 12, 14, 16, 18, 20, 23, 26, 29 and 32, sheet-like materials in which heat-shrinkage patterns have been produced in a regular or random manner can be obtained.

FIGS. 8 to 12 show the sheet-like materials processed by the apparatuses shown in FIGS. 1 to 7.

Figure 8:
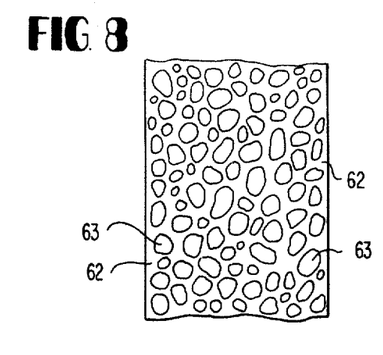
FIGS. 8 to 12 are sketches of sheet-like materials processed by the method of this invention.

Referring to FIG. 8 which illustrates a sheet-like material processed before or after dyeing, the shrunken portion of the sheet-like material which has directly contacted the heating device is shown at 62, and those portions which have not contacted the heating device are shown at 63. If the back surface has been contacted with the heating device, portions 63 form a protruding pattern on the front surface of the sheet.

Figure 9:
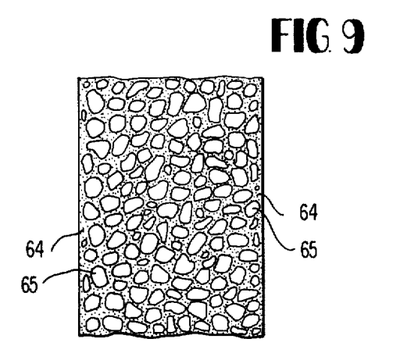

In FIG. 9, the sheet-like material is obtained by applying a dye to the entire surface of the sheet-like material and then subjecting it to coloration and molding at the same time. Reference numeral 64 shows a portion which has been deeply dyed and shrunken on direct contact with the heating device, and reference numeral 65 a portion which has not contacted the heating device and has not been dyed or else is dyed only to a light shade.

Figure 10:
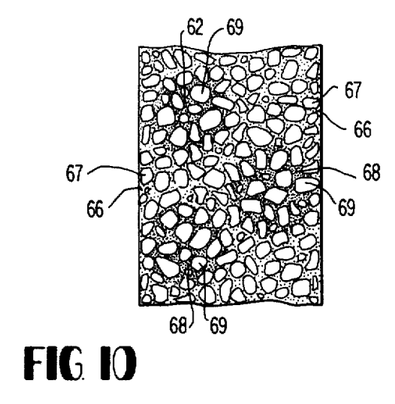

The sheet-like material shown in FIG. 10 was also obtained by applying a dye partially to the sheet-like material and subjecting it to coloration and a pattern forming operation at the same time. Reference numeral 66 shows a heat-shrunken portion to which the dye has not been adhered, and numeral 67 designates a non-heat-shrunken portion to which the dye has not been adhered. Portion 68 is a heat-shrunken part to which the dye has been adhered and which has been deeply dyed. Portion 69 is a non-heat-shrunken part to which the dye has not been adhered and which has been colored to a light shade.

Figure 11:
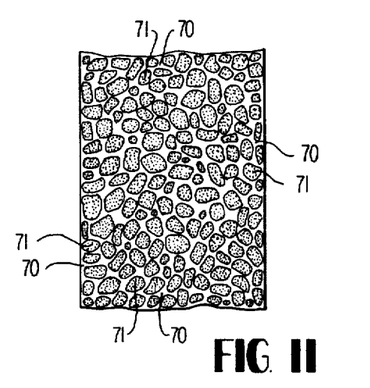

The sheet-like material shown in FIG. 11 has been obtained by applying a discharge printing paste that can effect discharge printing at high temperatures to all surface of a sheet-like material dyed with a dischargeable dye, and subjecting the sheet-like material to discharge printing and a pattern forming operation simultaneously. Reference numeral 70 shows a heat-shrunken portion which has been discharge printed, and the reference numeral 71 is a non-heat-shrunken portion free from discharge printing.

Figure 12:
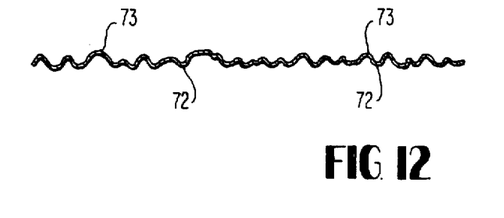

FIG. 12 is a sectional view of the sheet-like material shown in FIGS. 8 to 11. The reference numeral 72 is a portion which has been heat-shrunken on direct contact with the heating device, and the reference numeral 73 represents a portion which has risen in the direction opposite to the heating device and has not come into direct contact with the heating device.

FIGS. 14, 16, 18, 20, 23, 26, 29 and 32 are sketches of sheet-like materials processed using the apparatus shown in FIGS. 13, 15, 17, 19, 21, 24, 27 and 30, respectively.

Figure 14:
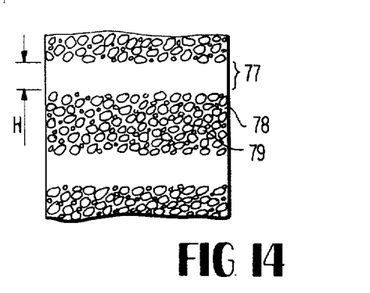
FIGS. 14, 16, 18, 20, 23, 26, 29 and 32 are views showing examples of sheet-like material processed by the method of this invention.

In FIG. 14, a portion 77 is a pattern corresponding to the grooved portion 76 shown in FIG. 13 and is not substantially heat-shrunken. Reference numeral 78 shows a shrunken portion which has come into direct contact with the heating device, and reference numeral 79 shows a portion which has not directly contacted the heating device.

Figure 16:
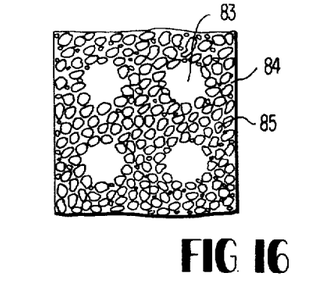

In FIG. 16, reference numeral 83 shows a pattern corresponding to the notched portion 82 in FIG. 15, which is not substantially heat-shrunken. Reference numeral 84 shows a portion which has been heat-shrunken on direct contact with the heating device, and numeral 85 a portion which has not directly contacted the heating device.

Figure 18:
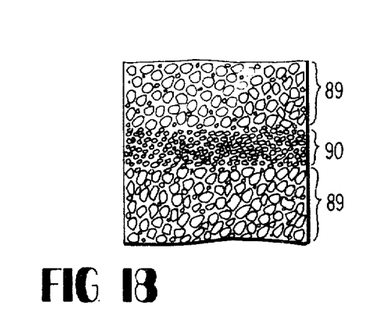

In FIG. 18, reference numeral 90 represents a pattern corresponding to the projected portion 88 shown in FIG. 17, which is a relatively small heat-shrinkage pattern. Numeral 89 shows a relatively large heat-shrinkage pattern formed by the surface of the roller other than the projecting portion 88.

Figure 20:
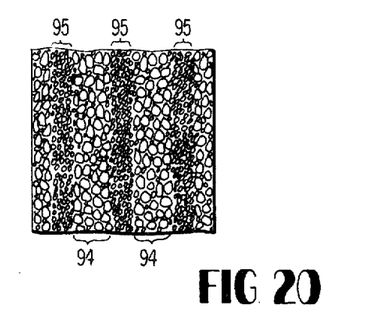

In FIG. 20, reference numeral 95 represents a pattern corresponding to the protruding portion 93 in FIG. 19, which is a relatively small heat-shrinkage pattern. Numeral 94 shows a relatively large heat-shrinkage pattern formed by the surface of the roller other than the protruding portion 93.

Figure 23:
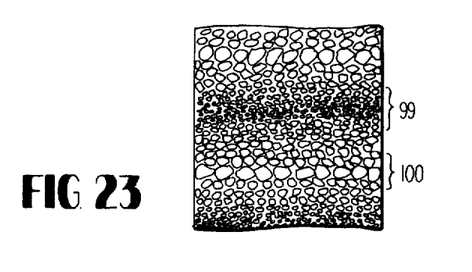

In FIG. 23, the sheet-like material produced by the apparatus shown in FIGS. 21 and 22 is shown. When a pair of the rollers 96 and 97 come close to each other, a relatively small heat-shrinkage pattern 99 is formed. On the other hand, if the rollers are apart from each other by a larger distance, a relatively large heat-shrinkage pattern 100 is formed. This operation is performed in a continuous manner.

Figure 26:
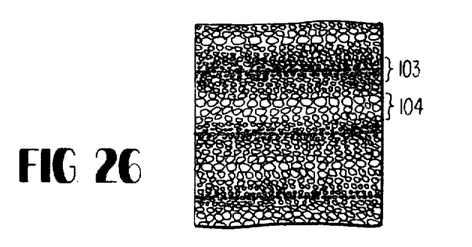

FIG. 26 shows a sheet-like material produced by the apparatus shown in FIGS. 24 and 25. A relatively small heat-shrinkage pattern 103 is formed by the projecting portions of the roller 101 and the roller 102, and a relatively large heat-shrinkage pattern 104 is formed by the roller 102 and the non-projecting portion of the roller 101.

Figure 29:
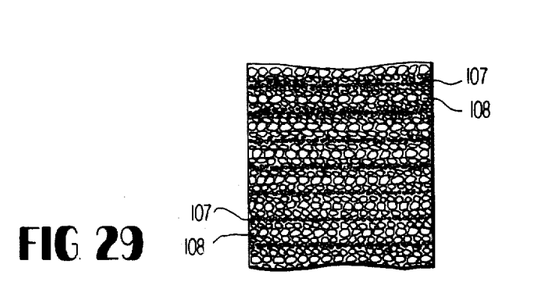

FIG. 29 shows a sheet-like material processed by apparatus including a polygonal roller as shown in FIGS. 27 and 28. A relatively small heat-shrinkage pattern 107 is formed by the roller 106 and the apex portion of the polygonal roller. On the other hand, a relatively large heat-shrinkage pattern 108 is formed by the roller 106 and the side portions of the polygonal roller.

Figure 32:
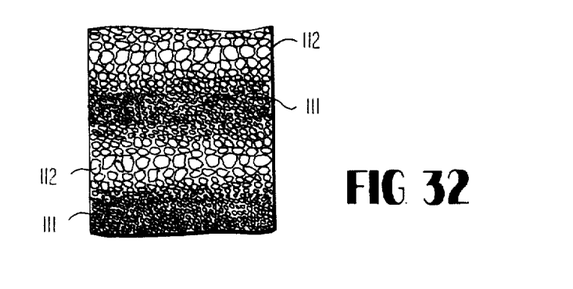

FIG. 32 shows a sheet-like material processed by the apparatus including an elliptical roller as shown in FIGS. 30 and 31. A relatively small heat-shrinkage pattern 111 is formed by the roller 110 and the major axis of the elliptical roller. On the other hand, a relatively large heat-shrinkage pattern 112 is formed by the roller 110 and the minor axis of the elliptical roller.

The sheet-like material having developed thereon a random venous or network-like heat-shrinkage pattern can be used as apparel material, material for bedding, interior decorative material, industrial material, packaging material, etc. Sheet-like materials which have been subjected to coloration and pattern formation simultaneously have especially good outward appearance and find a wide range of utility.

When a sheet-like material is first processed by the method of this invention and then dyed, different colors in dark and light shades can be imparted to the sheet-like material. It is also possible to process a dyed sheet-like material by the method of this invention.

By combining the processing method of this invention with a chemical pre- or post-treatment such as dyeing, printing, discharge printing or etching a great variety of heat-shrinkage patterns can be produced, and there can be obtained a product with good outward appearance.

Sheet-like materials of a more different outer appearance can be obtained by an embossing or calendering treatment or other physical treatments before or after the processing of the sheet-like materials by the method of this invention. A sheet-like material composed of two or more constituents bonded to each other, such as laminates, i.e., fabric-fabric, fabric-foam or fabric-film laminates, can also be processed in accordance with the method of this invention.

The sheet-like material processed by this invention may further be heated under tension in the longitudinal or transverse direction to remove the bulged portions and provide a planar pattern.

The following Examples are given to illustrate the present invention in greater detail.

EXAMPLE 1

A taffeta fabric (unit weight A g/m$^2$, thickness B mm, specific volume C cm$^3$/g and maximum shrinkage stress in the longitudinal direction 200 g/cm at 210°C.) made of polyethylene etrephthalate filaments (75 deniers/36 filaments-hereafter abbreviated $d/f$), which had been heat-set at 190°C. for 70 seconds, was passed under a tension of D g/cm in the longitudinal direction through a space formed between a rotating roller 3 with a radius of 7 cm having a smooth surface and heated at E°C. and a roller 4 with a radius of 7 cm and held at G°C. at a distance of F mm (the apparatus shown in FIG. 1) while bringing the fabric into contact with the roller 3. The time of contact of the fabric with the heated roller 3 was H seconds.

The above run was repeated under conditions A to H. The results obtained are shown in Table 1 below.

specific volume D cm³/g, maximum shrinkage stress in the longitudinal direction 350 g/cm at 170°C.) made of 50 $d/24\,f$ nylon 66 filaments, which had been heat-set at A°C., was passed under a tension E g/cm between a group of roller 14 held at F°C., roller 15 held at G°C., roller 16 held at H°C., roller 17 held at I°C. and roller 18 held at J°C. each having a radius of 7 cm and a smooth surface, and a group of rollers 9, 10, 11, 12 and 13 heated at I°C. (the apparatus shown in FIG. 3). The distance between rollers 9 and 14 was K mm; the distance between rollers 10 and 15, L mm; the distance between rollers 11 and 16, M mm; the distance between rollers 12 and 17, N mm; and the distance be- Table 1

| Run Nos. | Ag/m² | Bmm | Ccm³/g | Dg/cm | E°C | Fmm | F/B | G°C | Hsec | Outward appearance of the processed fabrics |
|---|---|---|---|---|---|---|---|---|---|---|
| 1 | 73 | 0.12 | 1.65 | 0.5 | 225 | 1.2 | 10 | 25 | 0.5 | Relatively large heat-shrinkage pattern having a bulged portion on one surface |
| 2 | 73 | 0.12 | 1.65 | 0.5 | 225 | 0.6 | 5 | 25 | 0.5 | Very small heat-shrinkage pattern having a bulged portion on one surface |
| 3 | 73 | 0.12 | 1.65 | 1.5 | 235 | 1.5 | 12.5 | 25 | 0.3 | Relatively large heat-shrinkage pattern having a bulged portion on one surface |
| 4 | 68 | 0.11 | 1.62 | 2.5 | 231 | 3.3 | 30 | 25 | 1.2 | Considerably large heat-shrinkage pattern having a bulged portion on one surface |
| 5 | 68 | 0.11 | 1.62 | 0.2 | 227 | 0.33 | 3 | 25 | 1.0 | Very small heat-shrinkage pattern having a bulged portion on one surface |
| 6 | 68 | 0.11 | 1.62 | 0.2 | 230 | 5.5 | 50 | 25 | 2.5 | Very large heat-shrinkage pattern having a bulged portion on one surface |
| 7 | 68 | 0.11 | 1.62 | 0.2 | 225 | 1.5 | 13.6 | 210 | 1.5 | Relatively large heat-shrinkage pattern having a bulged portion on both surfaces |
| 8 | 68 | 0.11 | 1.62 | 0.2 | 210 | 1.5 | 13.6 | 225 | 1.5 | ditto |
| 9 | 80 | 0.13 | 1.63 | 5.0 | 236 | 1.3 | 10 | 60 | 3.0 | Relatively large heat-shrinkage pattern having a bulged portion on one surface |
| 10 | 80 | 0.13 | 1.63 | 0.3 | 210 | 1.3 | 10 | 100 | 2.0 | ditto |

When the processed sheet-like material obtained in Run No. 1 was washed 10 times in a household washing machine, the outer appearance of this material was the same as that before washing.

EXAMPLE 2

A twill fabric (unit weight B g/m², thickness C mm,

Table 2a

| Run Nos. | A°C | Bg/m² | Cmm | Dcm³/g | Eg/cm | F°C | G°C | H°C | I°C | J°C | Kmm | K/C | Lmm |
|---|---|---|---|---|---|---|---|---|---|---|---|---|---|
| 1 | Non | 80 | 0.18 | 2.25 | 0.5 | 140 | 160 | 170 | 180 | 190 | 3.0 | 16.7 | 2.0 |
| 2 | Non | 80 | 0.18 | 2.25 | 0.5 | 160 | 180 | 190 | 195 | 200 | 4.0 | 22.2 | 3.0 |
| 3 | Non | 80 | 0.18 | 2.25 | 0.5 | 100 | 120 | 140 | 150 | 160 | 2.5 | 13.9 | 2.0 |
| 4 | Non | 70 | 0.11 | 1.57 | 2.0 | 120 | 140 | 160 | 170 | 180 | 2.0 | 18.2 | 1.9 |
| 5 | 140 | 80 | 0.18 | 2.25 | 0.5 | 140 | 160 | 180 | 190 | 200 | 3.0 | 16.7 | 2.0 |
| 6 | 140 | 80 | 0.18 | 2.25 | 0.5 | 140 | 160 | 180 | 190 | 200 | 4.0 | 22.2 | 3.0 |
| 7 | 180 | 80 | 0.18 | 2.25 | 0.5 | 160 | 170 | 180 | 200 | 210 | 3.0 | 16.7 | 2.0 | tween rollers 13 and 18, P mm. The contact time of the fabric was Q seconds with roller 14, R seconds with roller 15, S seconds with roller 16, T seconds with roller 17, and U seconds with roller 18. Under varying conditions A through U, the results obtained are shown in Table 2.

Table 2b

| Run Nos. | L/C | Mmm | M/C | mm | N/C | Pmm | P/C | Qsec | Rsec | Ssec | Tsec | Usec | Outward appearance of the processed fabric |
|---|---|---|---|---|---|---|---|---|---|---|---|---|---|
| 1 | 11.1 | 1.5 | 8.3 | 1.2 | 7.2 | 1.1 | 6.1 | 0.5 | 0.7 | 0.9 | 1.0 | 1.0 | Relatively small heat-shrinkage pattern having a bulged portion on one surface |
| 2 | 16.7 | 2.0 | 11.1 | 1.5 | 8.3 | 1.2 | 7.2 | 1.3 | 1.5 | 1.7 | 2.0 | 2.1 | ditto |

Table 2b Continued

| Run Nos. | L/C | Mmm | M/C | mm | N/C | Pmm | P/C | Qsec | Rsec | Ssec | Tsec | Usec | Outward appearance of the processed fabric |
|---|---|---|---|---|---|---|---|---|---|---|---|---|---|
| 3 | 11.1 | 1.8 | 10.0 | 1.5 | 8.3 | 1.2 | 7.2 | 1.8 | 1.8 | 2.0 | 2.1 | 2.2 | Relatively large heat-shrinkage pattern having a bulged portion on one surface |
| 4 | 17.3 | 1.8 | 16.4 | 1.6 | 14.5 | 1.6 | 14.5 | 1.8 | 2.0 | 2.2 | 2.5 | 2.5 | Large heat-shrinkage pattern having a bulged portion on one surface |
| 5 | 11.1 | 1.5 | 8.3 | 1.2 | 7.2 | 1.1 | 6.1 | 0.6 | 0.7 | 0.9 | 1.0 | 1.0 | Relatively small heat-shrinkage pattern having a bulged portion on one surface |
| 6 | 16.7 | 2.0 | 11.1 | 2.0 | 11.1 | 1.8 | 10.0 | 0.5 | 0.6 | 0.7 | 0.8 | 0.8 | Large heat-shrinkage pattern having a bulged portion on one surface |
| 7 | 11.1 | 1.5 | 8.3 | 1.2 | 7.2 | 1.1 | 6.1 | 0.6 | 0.7 | 0.9 | 1.0 | 1.0 | Relatively small heat-shrinkage pattern having a bulged portion on one surface |

Table 2c

| Run Nos. | A°C | B g/m² | C mm | D cm³/g | E g/cm | F°C | G°C | H°C | I°C | J°C | K mm | K/C | L mm |
|---|---|---|---|---|---|---|---|---|---|---|---|---|---|
| 8 | 180 | 80 | 0.18 | 2.25 | 1.5 | 170 | 180 | 190 | 200 | 215 | 3.0 | 16.7 | 2.0 |
| 9 | 180 | 70 | 0.11 | 1.57 | 1.5 | 190 | 200 | 210 | 215 | 220 | 5.5 | 50 | 4.4 |
| 10 | 200 | 80 | 0.18 | 2.25 | 0.5 | 190 | 200 | 210 | 220 | 225 | 3.0 | 16.7 | 2.0 |
| 11 | 200 | 80 | 0.18 | 2.25 | 0.5 | 190 | 200 | 210 | 220 | 225 | 2.5 | 13.9 | 2.0 |
| 12 | 200 | 70 | 0.11 | 1.57 | 1.5 | 200 | 210 | 220 | 225 | 230 | 2.0 | 18.2 | 1.9 |

Table 2d

| Run Nos. | L/C | Mmm | M/C | Nmm | N/C | Pmm | P/C | Qsec | Rsec | Ssec | Tsec | Usec | Outward appearance of the processed fabric |
|---|---|---|---|---|---|---|---|---|---|---|---|---|---|
| 8 | 11.1 | 1.5 | 8.3 | 1.2 | 7.2 | 1.1 | 6.1 | 0.6 | 0.7 | 0.9 | 1.0 | 1.0 | diddo |
| 9 | 40 | 3.3 | 30 | 2.2 | 20 | 2.2 | 20 | 1.8 | 2.0 | 2.2 | 2.5 | 2.5 | Considerably large heat-shrinkage pattern having a bulged portion on one surface |
| 10 | 11.1 | 1.5 | 8.3 | 1.2 | 7.2 | 1.1 | 6.1 | 0.6 | 0.7 | 0.9 | 1.0 | 1.0 | Relatively small heat-shrinkage pattern having a bulged portion on one surface |
| 11 | 11.1 | 1.5 | 8.3 | 1.1 | 6.1 | 0.8 | 4.4 | 1.8 | 2.0 | 2.2 | 2.5 | 2.5 | Very small heat-shrinkage pattern having a bulged portion on one surface |
| 12 | 17.3 | 1.8 | 1.4 | 1.6 | 14.5 | 1.1 | 10 | 2.5 | 2.7 | 3.0 | 3.1 | 3.1 | Relatively small heat-shrinkage pattern having a bulged portion on one surface |

EXAMPLE 3

A tricot knitted fabric (unit weight 100 g/m², thickness 0.21 mm, specific volume 2.1 cm³/g, maximum shrinkage stress in the longitudinal direction 150 g/cm at 195°C.) composed of a 50 d/24 f polyethylene terephthalate yarn, which had been heat-set at 180°C., was passed under no tension between a rotating stainless steel roller 3 with a radius of 7 cm having a smooth surface and heated at 235°C. and a non-heated roller 4 with a radius of 7 cm spaced from the roller 3 at a distance of 1.2 mm (the apparatus shown in FIG. 1). The time of contact of the knitted fabric with the heated roller 3 was 2.5 seconds. The processed fabric had a some what large heat-shrinkage pattern as shown in FIG. 8.

For comparison, a jersey (unit weight 214 g/m², thickness 1.42 mm, specific volume 6.65 cm³/g, maximum shrinkage stress in the longitudinal direction 20.5 g/cm at 210°C.) composed of of a 150 d/30 f polyethylene terephthalate yarn, which had been heat-set at 180°C., was passed under no tension between a rotating roller 3 with a radius of 7 cm having a smooth surface and heated at 235°C. and a non-heated roller 4 with a radius of 7 cm spaced from the roller 3 by a distance of 6.2 mm (the apparatus shown in FIG. 1). The time of contact of the heated roller 3 with the fabric was 2.5 seconds. No heat-shrinkage pattern was developed on the fabric.

EXAMPLE 4

A twill fabric (unit weight 85 g/m², thickness 0.19 mm, specific volume 2.24 cm³/g, maximum shrinkage stress in the longitudinal direction 210 g/cm at 180°C.) composed of a 50d/24f polyethylene terephthalate yarn, which had been heat-set a 170°C., was immersed in a 3% by weight aqueous solution of a disperse dye of the following formula and squeezed with a mangle so that the pick-up become 60% by weight, followed by drying. The treated fabric was passed under a tension of 1 g/cm in the longitudinal direction between a roller 27 having a radius of 17 cm heated at 225°C. and a non-heated roller 23 spaced from it by a distance of 1.8 mm, between the roller 27 and a non-heated roller 24 spaced from it by a distance of 1.5 mm, between the roller 27 and a non-heated roller 25 spaced from it by a distance of 1.2 mm and between the roller 27 and a non-heated roller 26 spaced from it by a distance of 1.0 mm (the apparatus shown in FIG. 4). The total time of contact of the fabric with the roller 27 was 15 seconds.

The fabric was then contacted with an aqueous solution containing 1 g/liter of $Na_2CO_3$, 1 g/liter of $Na_2S_2O_4$ and 1 g/liter of sodium cetylsulfate (an anionic dispersant) at 60°C. for 30 minutes to remove the uncolored dye, and dried at 100°C. for 3 minutes.

The processed fabric had a thermally shrunken portion 64 colored deep violet and a bulged portion 65 colored in a light shade, as shown in FIG. 9.

EXAMPLE 5

A broad cloth (unit weight D g/m², thickness E mm, specific volume F cm³/g) composed of a blend of B% of polyethylene terephthalate staples and C% of cotton, which had been heat-set at A°C. was passed under no tension between a plate heater 33 having a width of 5 cm and heated at G°C. and a non-heated roller 32 with a radius of 7 cm spaced from the heater 35 by a distance of H mm, between a plate heater 35 with a width of 5 cm heated at I°C. and a non-heated roller 35 with a radius of 7 cm spaced from the heater 35 by a distance of J mm, and between a plate heater 37 with a width of 5 cm heated at K°C. and a non-heated roller 36 with a radius of 7 cm spaced from the heater 37 by a distance of L mm (the apparatus shown in FIG. 5). The total time of contact of the cloth with the heater plates 33, 35 and 37 was 11 seconds. Under varying conditions A to L, the results obtained were as follows:

between a roller 44 heated at 180°C. and a non-heated roller spaced from it by a distance of 1.8 mm, between a roller 46 heated at 200°C. and a non-heated roller 47 spaced from it by a distance of 1.6 mm and between a roller 48 heated at 230°C. and a non-heated roller 49 spaced from it by a distance of 1.4 mm (the apparatus shown in FIG. 6). The total time of contact of the fabric with the heated rollers 42, 44, 46 and 48 was 8 seconds. The processed fabric had a heat-shrinkage pattern having a bulged portion on one surface.

For comparison, the above procedure was repeated except the fabric was under a tension of 200 g/cm in the longitudinal direction during processing. No heat-shrinkage pattern was obtained.

EXAMPLE 7

A tricot knitted fabric (unit weight 100 g/m², thickness 0.21 mm, specific volume 2.1 cm³g/, maximum heat shrinkage stress in the longitudinal direction 100 g/cm at 130°C.) composed of a 50d/26f polyethylene yarn was passed under a tension of 2 g/cm between a roller 54 heated at 120°C. and a non-heated belt 55 spaced from it by a distance of 2.2 mm, between a roller 56 heated at 135°C. and a non-heated belt 57 spaced from it by a distance of 1.8 mm, and between a roller 58 heated at 154°C. and a non-heated belt 59 spaced from it by a distance of 1.5 mm (the apparatus shown in FIG. 7). The total time of contact of the knitted fabric with the heated rollers 54, 56 and 58 was 6 seconds. The processed tricot knitted fabric had a relatively large heatshrinkage pattern.

EXAMPLE 8

A polypropylene film (unit weight 10 g/m², thickness 0.08 mm, specific volume 0.8 cm³/g, maximum shrinkage stress in the longitudinal direction of 5.2 g/cm at 125°C.) was passed under no tension between a rotating roller 3 with a radius of 7 cm having a smooth surface and heated at 145°C. and a non-heated roller 4

Table 3

| Run Nos. | A°C | B% | C% | Dg/m² | Emm | Fcm³/g | G°C | Hmm | I°C | Jmm | K°C | Lmm | Outward appearance of the processed cloth |
|---|---|---|---|---|---|---|---|---|---|---|---|---|---|
| 1 | Non | 80 | 20 | 115 | 0.20 | 1.74 | 170 | 2.0 | 190 | 1.8 | 210 | 1.5 | Slightly large heat-shrinkage pattern |
| 2 | Non | 65 | 35 | 129 | 0.21 | 1.63 | 170 | 2.0 | 190 | 1.8 | 210 | 1.5 | ditto |
| 3 | Non | 40 | 60 | 132 | 0.21 | 1.59 | 170 | 2.0 | 190 | 1.8 | 210 | 1.5 | Large heat-shrinkage pattern |
| 4 | 150 | 80 | 20 | 115 | 0.20 | 1.74 | 170 | 2.0 | 190 | 1.8 | 210 | 1.5 | ditto |
| 5 | 150 | 80 | 20 | 115 | 0.20 | 1.74 | 190 | 2.0 | 200 | 1.8 | 225 | 1.5 | Small heat-shrinkage pattern |
| 6 | 150 | 80 | 20 | 115 | 0.20 | 1.74 | 190 | 2.0 | 200 | 1.5 | 225 | 0.8 | Very small heat-shrinkage pattern |
| 7 | 150 | 65 | 35 | 129 | 0.21 | 1.63 | 190 | 2.0 | 200 | 1.8 | 225 | 1.5 | Slightly large heat-shrinkage pattern |
| 8 | 150 | 40 | 60 | 132 | 0.21 | 1.59 | 195 | 3.0 | 205 | 2.0 | 230 | 1.8 | Considerably large heat-shrinkage pattern |
| 9 | 180 | 65 | 35 | 127 | 0.22 | 1.73 | 180 | 2.0 | 190 | 1.8 | 220 | 1.4 | ditto |
| 10 | 180 | 65 | 35 | 127 | 0.22 | 1.73 | 190 | 1.8 | 200 | 1.4 | 230 | 0.8 | Very small heat-shrinkage pattern |

EXAMPLE 6

A twill fabric (unit weight 135 g/m², thickness 0.31 mm, specific volume 2.3 cm³/g, maximum shrinkage stress in the longitudinal direction 70 g/cm at 210°C.) composed of a 75d/36f polyethylene terephthalate textured yarn, without any relaxing or heat-setting, was passed under a tension of 1 g/cm in the longitudinal direction between a roller 42 heated at 160°C. and a non-heated roller 43 spaced from it by a distance of 2.0 mm, with a radius of 7 cm spaced from the roller 3 by a distance of 0.8 mm (the apparatus shown in FIG. 1). The time of contact of the film with the heated roller 3 was one second. The film so processed developed a small heat-shrinkage pattern.

EXAMPLE 9

A synthetic fiber paper (unit weight 20 g/m², thickness 0.08 mm, specific volume 0.4 cm³/g, maximum heat-shrinkage stress in the longitudinal direction 3.1 g/cm at 130°C.) composed of 80% polypropylene fibers 2 denier in size and 6 mm in length and 20% viscose rayon fibers 2 denier in size 6 mm in length was passed under no tension between a rotating roller 3 with a radius of 7 cm having a smooth surface and heated at 150°C. and a non-heated roller 4 with a radius of 7 cm spaced from it by a distance of 4 mm (the apparatus shown in FIG. 1). The time of contact of the sheet with the heated roller 3 was 1 second, and the sheet so processed had a relatively large heat-shrinkage pattern of excellent outward appearance.

For comparison, the above procedure was repeated except that the non-heated roller 4 was not used. The heat-shrinkage pattern obtained was very large, and the outward appearance was poor. There was no reproducibility of the pattern.

EXAMPLE 10

The same fabric as was used in Example 4 was printed in circular patterns using a printing paste of the following composition:

(red disperse dye)

| | |
|---|---|
| Sodium cetylsulfate (anionic dispersant) | 2 g |
| Trichlorobenzene (carrier) | 4 g |
| Carboxymethyl cellulose (10% aqueous solution) | 90 g | and then dried for 2 minutes at 80°C. The fabric was passed under a tension of 1.5 g/cm in the longitudinal direction between a rotating roller 3 with a radius of 7 cm having a smooth surface and heated at 230°C. and a non-heated roller 4 with a radius of 7 cm spaced from it by a distance of 1.8 mm (the apparatus shown in FIG. 1) while bringing the fabric into contact with the heated roller 3. The time of contact of the fabric with the heated roller was 2.5 seconds.

Then, under the same conditions as mentioned in Example 4, reduction clearing was performed, and the fabric was dried at 120°C for 2 minutes. The processed fabric had a heat shrunken portion dyed in deep red and a bulged portion dyed in light color, as shown in FIG. 10.

A one-piece dress, which was produced using this processed fabric, exhibited a superior outward appearance. This shows that the sheet-like material processed in accordance with the method of this invention is suitable for apparel uses.

EXAMPLE 11

The same fabric as used in Example 4 was immersed in a dye bath of the following composition:

(yellow disperse dye) 40 g

| | |
|---|---|
| Naphthalene sulfonic acid-formaldehyde condensate (anionic dispersant) | 1 g |
| Water | 959 g | squeezed by a mangle to an extent of 60% pick-up, and dried at 60°C. The fabric was then subjected to thermosol dyeing for 30 seconds at 200°C. and then immersed in a treating bath of the following composition:

| | |
|---|---|
| Thiodiethylene glycol (dye solubilizing agent) | 10 g |
| Trichlorobenzene (carrier) | 100 g |
| Stannous chloride | 60 g |
| Water | 830 g | squeezed by a mangle to an extent of 55% by weight, and dried at 60°C. The fabric was passed then under a tension of 1.2 g/cm in the longitudinal direction between a rotating roller 3 with a radius of 7 cm having a smooth surface and heated at 230°C. and a non-heated roller 4 with a radius of 7 cm spaced from the roller 3 by a distance of 1.5 mm (the apparatus shown in FIG. 1), while bringing the fabric into contact with the roller 3. The time of contact of the fabric with the heated roller 3 was 2.5 seconds. The fabric was then treated with an aqueous solution containing 1 g/liter of sodium hydroxide and 0.5 g/liter of a non-ionic surface active agent, washed with water, and dried. The processed fabric, as shown in FIG. 11, had a pattern wherein only those portions which directly contacted the heated roller were discharge printed.

EXAMPLE 12

The same fabric as was used in Example 4 was passed under no tension between a rotating heated roller 3 with a radius of 7 cm having a smooth surface and heated at 220°C. and a nonheated roller 4 with a radius of 7 cm spaced from the roller 3 by a distance of 1.2 mm at a speed of 2 meters/min. for 10 seconds, then passed between them under a tension of 290 g/cm in the longitudinal direction at a speed of 2 meters/min. for 10 seconds while bringing the fabric into contact with the roller 4, and further passed under no tension between them at a speed of 2 meters/min. for 10 seconds. This operation was repeated. The processed fabric developed a small heat-shrinkage pattern at predetermined intervals.

EXAMPLE 13

A crepe fabric (unit weight 61 g/m², thickness 0.19 mm, specific volume 3.12 cm³/g, maximum shrinkage stress in the longitudinal direction 218 g/cm at 170°C.) was made using a 50d/24f polyethylene terephthalate yarn as a warp and a 50d/24f textured polyethylene terephthalate yarn as a weft, and without heat-setting and creping, was processed using the same apparatus as shown in FIG. 1.

Specifically, the fabric was passed under a tension of 1.2 g/cm in the longitudinal direction between a rotating roller 3 with a radium of 7 cm having a smooth surface and heated at 232°C. and a non-heated roller 4 with a radius of 7 cm spaced from the roller 3 by a distance of 1.2 mm. The time of contact of the fabric with the heated roller 3 was 1.1 seconds, and the processed fabric had a relatively small heat-shrinkage pattern. The fabric so processed was creped by treatment in water at 100°C. for 60 minutes. The portion which had come into direct contact with the heated roller did not develop crepes, but at the other portions, crepes were formed. The fabric exhibited a unique outward appearance with the heat shrinkage pattern and a dicontinuous crepe pattern.

EXAMPLE 14

The fabric having the heat-shrinkage pattern which was obtained in Example 6 was processed at a speed of 2 meters/min. at 200°C. and 5 kg/cm² using an ordinary embossing calender roll having a diameter of 10 cm and flower designs carved thereon. The fabric so processed had an excellent outer appearance containing both flower designs and a heat-shrinkage pattern.

EXAMPLE 15

A cotton jersey composed of a ply yarn of 40 count was bonded to a taffeta fabric composed of a 50$d$/24$f$ polyethylene terephthalate yarn to form a bonded fabric (unit weight 250 g/m², thickness 1.1 mm, specific volume 4.4 cm³/g, maximum heat-shrinkage stress in the longitudinal direction 290 g/cm at 180°C.). The bonded fabric was passed under no tension between a rotating roller 3 with a radius of 7 cm having a smooth surface and heated at 228°C. and a non-heated roller 4 with a radius of 7 cm spaced from the roller 3 by a distance of 4.5 mm while the the taffeta fabric side was being contacted with the roller 3. The time of contact of the fabric with the heated roller was 1.5 seconds. The fabric so processed developed a heat-shrinkage pattern with relatively large bulged portions on the jersey side.

EXAMPLE 16

The fabric processed in Example 13 was dyed for 60 minutes at 100°C. with an aqueous dye bath containing 2% o.w.f. of an orange-color disperse dye of the formula and 4 g/liter of methyl naphthalene (carrier). The dyed fabric lost its solid feeling, but the portions which came into direct contact with the heating roller (i.e., the portions where no crepe was formed) became light in color, and the portions which developed crepes turned relatively dark orange, thus exhibiting a dark/light color pattern.

EXAMPLE 17

The fabric processed in Run No. 3 of Example 1 was treated for 25 minutes at 100°C. in an aqueous solution containing 20 g/liter of sodium hydroxide, and then neutralized with an aqueous solution containing 2 g/liter of acetic acid, followed by washing and drying. At the portion which had come into direct contact with the heated roller, there was a great weight loss, and the fagric became transparent with a loss of ruggedness. Thus, there was obtained a fabric which had an unique transparent pattern.

EXAMPLE 18

A tropical fabric (unit weight 130 g/m², thickness 0.26 mm, specific volume 2.0 cm³/g, maximum heat-shrinkage stress 209 g/cm at 170°C.) made of 75% polyethylene terephthalate staples and 25% acrylonitrile staples was immersed in a 3 wt. % aqueous solution of a blue disperse dye of the following formula squeezed by a mangle to a pick-up of 60% by weight, and dried at 60°C. The fabric was passed under a tension of 1.1 g/cm in the longitudinal direction between a rotating roller 3 with a radius of 7 cm having a smooth surface and heated at 234°C. and a roller 4 with a radius of 6 cm heated at 228°C. and spaced from the roller 3 by a distance of 2.0 mm (the apparatus shown in FIG. 1). The time of contact of the fabric with the heated rollers 3 and 4 was 1.5 seconds. The processed fabric was subjected to reduction clearing using an aqueous solution consisting of 1 g/liter of $Na_2CO_3$, lg/liter of $Na_2S_2O_4$ and 1 g/liter of sodium cetylsulfate (anionic dispersant) at 100°C. for 3 minutes. The fabric had bulged portions on both surfaces. The portions which came into direct contact with the rollers were colored deep blue, and the bulged portions were colored a light shade, presenting deep/light color pattern.

EXAMPLE 19

A plain woven fabric (unit weight 98 g/m², thickness 0.16 mm, specific volume 1.63 cm³/g) made of a 75$d$/36$f$ polyethylene terephthalate filament as a warp and a 75$d$/20$f$ triacetate filament as a weft was heat-set for one minute at 170°C., and then dyed with an aqueous dye bath of the following composition at 130°C. for 60 minutes.

(yellow disperse dye)

3% o.w.f.

(orange disperse dye)

Naphthalene sulfonic acid-
formaldehyde condensate    1 g/liter

The dyed fabric was subjected to reduction clearing, and dried. Under no tension, the dyed fabric (maximum heat-shrinkage stress in the longitudinal direction 150 g/cm at 195°C.) was passed between a rotating roller 3 with a radius of 8 cm having a smooth surface and heated at 230°C. and a non-heated roller 4 with a radius of 8 cm having a crepe-patterned surface and spaced from the roller 3 by a distance of 1.8 cm (the apparatus shown in FIG. 1) while the fabric was being contacted with the roller 3. The time of contact of the fabric with the heated roller 3 was 1.5 seconds. The fabric so processed had a relatively large heat-shrinkage pattern.

While the invention has been described in detail and with reference to specific embodiments thereof, it will be apparent to one skilled in the art that various changes and modifications can be made therein without departing from the spirit and scope thereof.

What we claim is:

1. A method of processing a heat-shrinkable sheet-like material having a specific volume of not more than 5 cm³/g and a maximum heat-shrinkage stress under dry heat of at least 1/10 W g/cm wherein W is the weight in grams of the sheet-like material per square meter, to produce a pattern in said material comprising passing said sheet-like material sequentially through nips between a first heating device heated to a surface temperature not lower than the minimum temperature at which the sheet-like material can shrink but below the melting point of the heat-shrinkable substance contained in said sheet-like material to produce a pattern in said material and a second heated device heated to a surface temperature which is at least the temperature of the atmosphere during processing but is below the melting or softening point of any heat-shrinkable thermoplastic substance contained in said sheet-like material and spaced from said first heating device by a distance larger than the thickness of said sheet-like material but not larger than 100 times the thickness of the sheet-like material to control the pattern produced in said sheet-like material, under a tension not exceeding the shrinkage stress of said sheet-like material while bringing the sheet-like material into contact with said first heating device without positive pressing thereto and at least bringing a portion of said sheet-like material into contact with said second device, heating the sheet-like material and developing a random solid heat-shrinkage pattern thereon, there being at least two of said first heating devices and two of said second heated devices used, said first and second devices being used in pairs.

2. The method of claim 1 wherein said sheet-like material is selected from the group consisting of films, non-woven fabrics, heat shrinkable paper, knitted fabrics and woven fabrics each of which is composed of a material comprising a major proportion of a heat-shrinkable thermoplastic substance.

3. The method of claim 1 wherein the distance between the first heating devices and the second devices becomes progressively smaller towards the advancing direction of the sheet-like material.

4. The method of claim 1 wherein said sheet-like material has a dye adhered therto.

* * * * *